United States Patent
Jack et al.

(10) Patent No.: US 6,472,792 B1
(45) Date of Patent: Oct. 29, 2002

(54) STATOR WITH TEETH FORMED FROM A SOFT MAGNETIC POWDER MATERIAL

(75) Inventors: Alan G. Jack, Northumberland (GB); Barrie Mecrow, Tyne and Wear (GB); John Terence Evans, Newcastle upon Tyne (GB); James Stonehouse Burdess, Whitley Bay (GB); John Neville Fawcett, Northumberland (GB); Dawn Stephenson, Newcastle upon Tyne (GB); Phillip George Dickinson, Northumberland (GB)

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 09/743,325

(22) PCT Filed: May 10, 2000

(86) PCT No.: PCT/SE00/00923

§ 371 (c)(1),
(2), (4) Date: Mar. 5, 2001

(87) PCT Pub. No.: WO00/69047

PCT Pub. Date: Nov. 16, 2000

(30) Foreign Application Priority Data

May 11, 1999 (SE) .............................................. 9901745

(51) Int. Cl.$^7$ ................................................ H02K 1/12
(52) U.S. Cl. ........................ 310/254; 310/216; 310/218
(58) Field of Search ........................... 310/254, 43, 44, 310/208, 216, 218, 49 R

(56) References Cited

U.S. PATENT DOCUMENTS

| | | | | |
|---|---|---|---|---|
| 2,607,816 A | * | 8/1952 | Ryder et al. ................. | 171/252 |
| 4,947,065 A | * | 8/1990 | Ward et al. .................... | 310/44 |
| 5,729,072 A | | 3/1998 | Hirano et al. ................ | 310/258 |
| 6,081,059 A | * | 6/2000 | Hsu ............................ | 310/179 |

FOREIGN PATENT DOCUMENTS

| | | |
|---|---|---|
| DE | 2 134 039 | 1/1973 |
| WO | 99/50949 | 10/1999 |
| WO | 99/54985 | 10/1999 |

* cited by examiner

*Primary Examiner*—Tran Nguyen
*Assistant Examiner*—Thanh Lam
(74) *Attorney, Agent, or Firm*—Burns, Doane, Swecker & Mathis, LLP

(57) ABSTRACT

A stator core for an electrical machine includes an annular yoke and a plurality of teeth spaced circumferentially on the annular yoke and extending radially therefrom, the spaces between the teeth defining circumferentially spaced winding slots. The teeth are formed as separate components from a soft magnetic powder material. Each tooth has non-decreasing cross-sectional dimensions in a direction towards a distal tip along a length of the tooth corresponding to a winding slot, and has the same or smaller cross-sectional dimensions along a proximal end of the tooth. Thereby, the tooth may be assembled with a core-back section of the annular yoke and is able to receive a coil before the assembling with the yoke.

13 Claims, 5 Drawing Sheets

STATOR WITH TEETH FORMED FROM A SOFT MAGNETIC POWDER MATERIAL

TECHNICAL FIELD

The present invention generally is related to electrical machines, especially motors, and more precisely to the structure of the stator assembly thereof.

BACKGROUND OF THE INVENTION AND THE PRIOR ART

Electrical machines work by the interaction of magnetic flux and current. At operating limits the magnetic flux is limited by saturation of the soft magnetic material and the current by the temperature resulting from ohmic heating. If more space is provided for conductor to reduce current densities and hence ohmic heating, the magnetic flux is also reduced and vice versa if more soft magnetic material is included the flux is increased but the conductor area is reduced and ohmic heating increased.

In most machines the conductors are contained in slots. It is necessary to semi-close the slots to obtain a smooth torque output and the result is that placing the windings in the slots is a difficult task which results in a rather poor ratio of conductor area to slot area. Ratios in the region of 50% are considered good. This poor ratio is bad for two reasons, firstly space is wasted which could be used for conductor or soft magnetic material and secondly the space in the slot will act as a thermal barrier increasing the temperature for a given ohmic loss.

SUMMARY

An object of this invention is to provide a stator core for an electrical machine which stator core provides a better ratio of conductor area to slot area than stators in the prior art.

This object is achieved in that a stator in accordance with the present invention is characterised by the features specified in the appended claim 1. Preferred embodiments of that stator are defined in the dependent claims.

Thus, this invention is concerned with exploiting the good surface finish, tight dimensional tolerance and three dimensional magnetic flux carrying capabilities of soft magnetic composites by breaking a motor's iron core into separate tooth and core back sections. These separate sections allow separately produced simple bobbin wound type coils to be assembled with the core sections to make units which are joined together and assembled within the motor's frame.

The coils being produced away from the geometric difficulties of insertion into the slots can have a far higher ratio of copper to slot area; using machine winding 70% is easily achieved. If the further step is taken to compress the coils in a die, 81% has been achieved which is getting close to the theoretical maximum (which is fixed by the need for insulation around the conductors).

The result of this high ratio of conductor to slot area is a major reduction in coil resistance and hence in ohmic losses and a large increase in thermal conduction. The result is that at limit the motor will produce far more output, lowering capital cost and offering efficiency, size and weight benefits.

At the same time, the sub-components proposed are easily produced by cheap and fully automated processes, and the requirements for mechanical strength, withstand of electrical breakdown and dimensional tolerance are easily met. This is in contrast to a conventional machine whose winding either requires much handwork or expensive and difficult-to-set-up winding machines.

DESCRIPTION OF THE PREFERRED EMBODIMENTS

Figure 1:
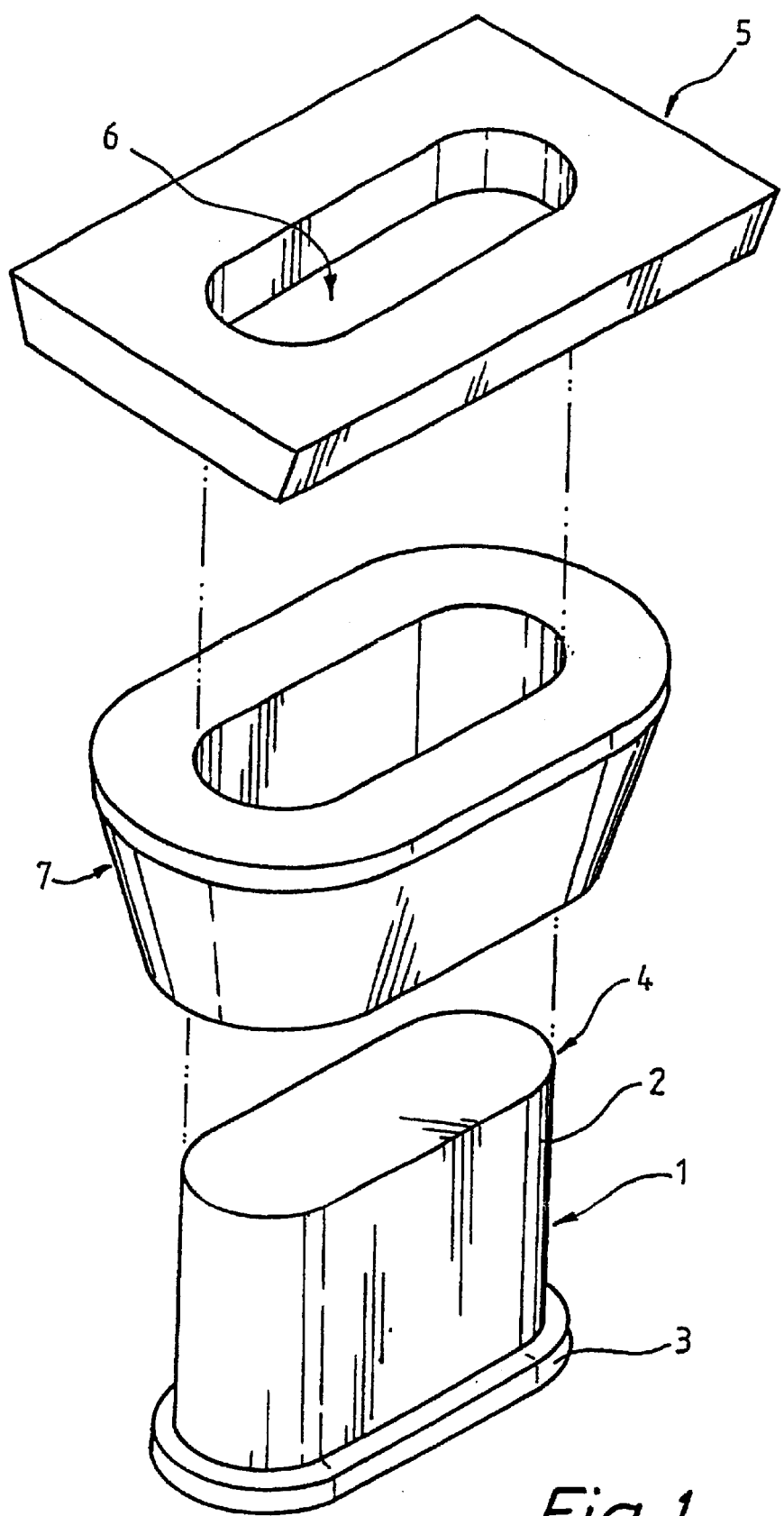
FIG. 1 is a perspective view showing a separate tooth and a separate core-back section according to a first embodiment of the present invention as well as a separate coil.
Figure 2:
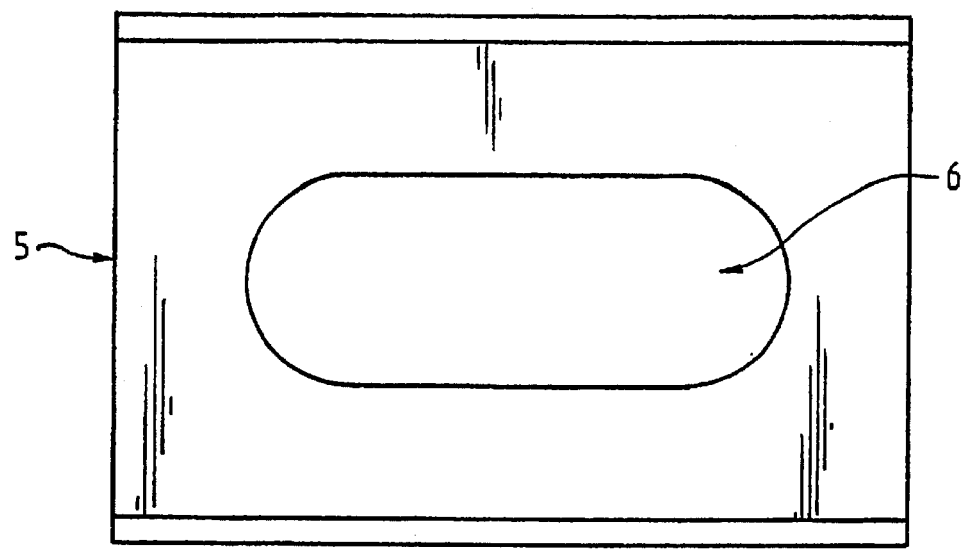
FIG. 2 is a plan view of the separate core-back section shown in FIG. 1.
Figure 3:
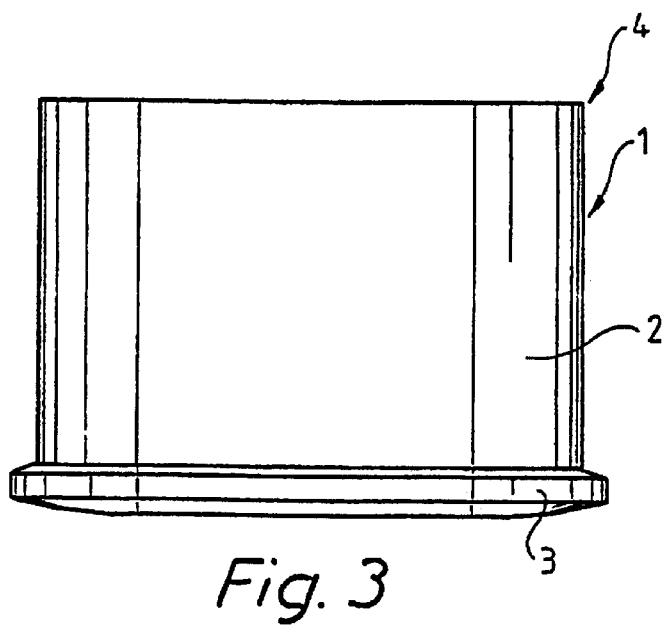
FIG. 3 is a side view of the separate tooth shown in FIG. 1.
Figure 4:
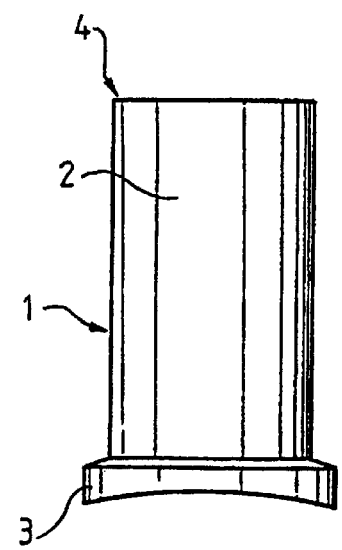
FIG. 4 is an end view of the separate tooth shown in FIGS. 1 and 3.

A stator tooth 1 illustrated in FIGS. 1 and 3–6 has a stem 2 of constant cross-sectional area and a distal tip 3 of larger cross-sectional area than the stem 2. Preferably, the tooth 1 is made by compressing a soft magnetic powder material, such as Somaloy 500 made by Höganäs AB of Sweden.

The stator tooth 1 has a proximal end portion 4 of the same cross-sectional area as (or less cross-sectional area than) the stem 2.

A stator core-back section 5 illustrated in FIGS. 1, 2, 5 and 6 is of conventional shape except for a radial through-hole 6 having the same cross-sectional area as the proximal end portion 4 of the tooth 1 in FIGS. 1 and 3–6. The core-back section 5 may be made of the same material as the tooth 1, the surface of the hole 6 as well as the dimensions thereof being such as to enable a close fit with the proximal end portion 4 of the tooth 1.

Figure 5:
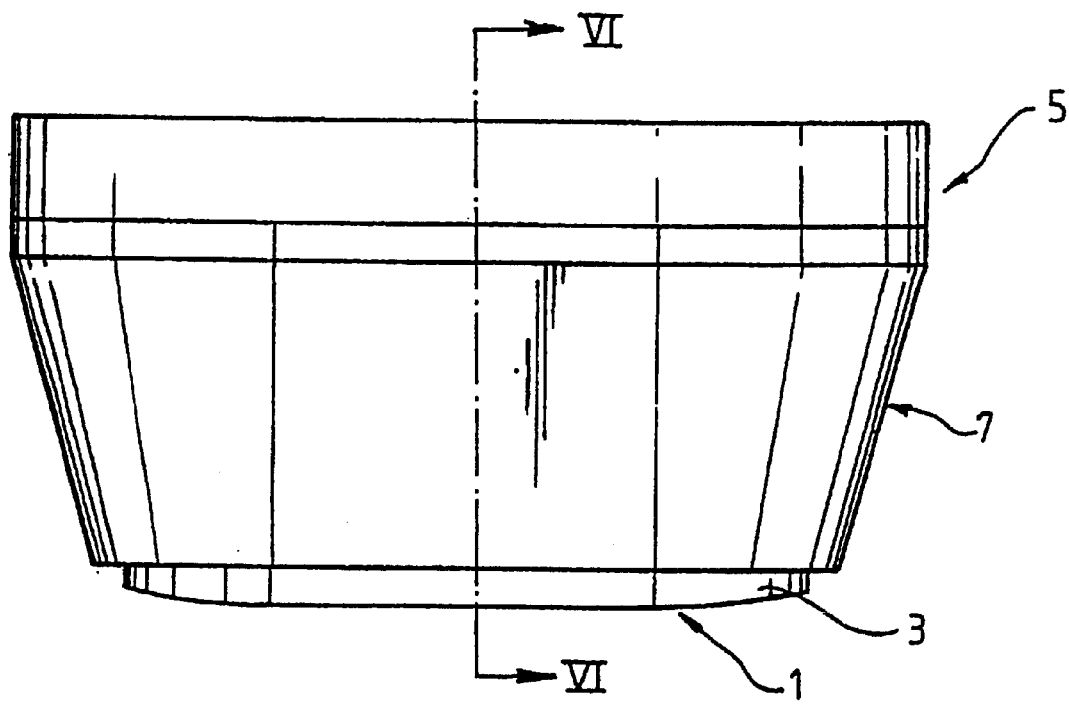
FIG. 5 is a side view corresponding to FIG. 3 and illustrating the components of FIG. 1 in an assembled state.
Figure 6:
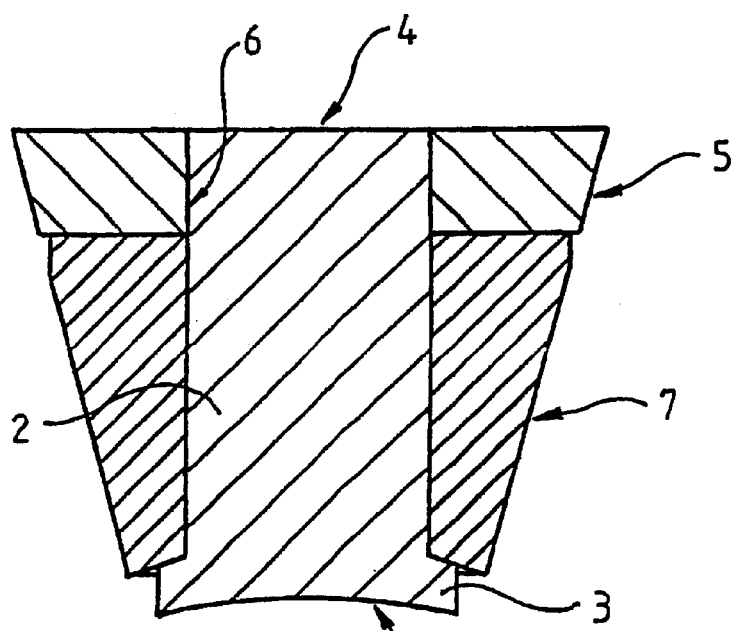
FIG. 6 is a cross-sectional view along the line VI—VI in FIG. 5.
Figure 9:
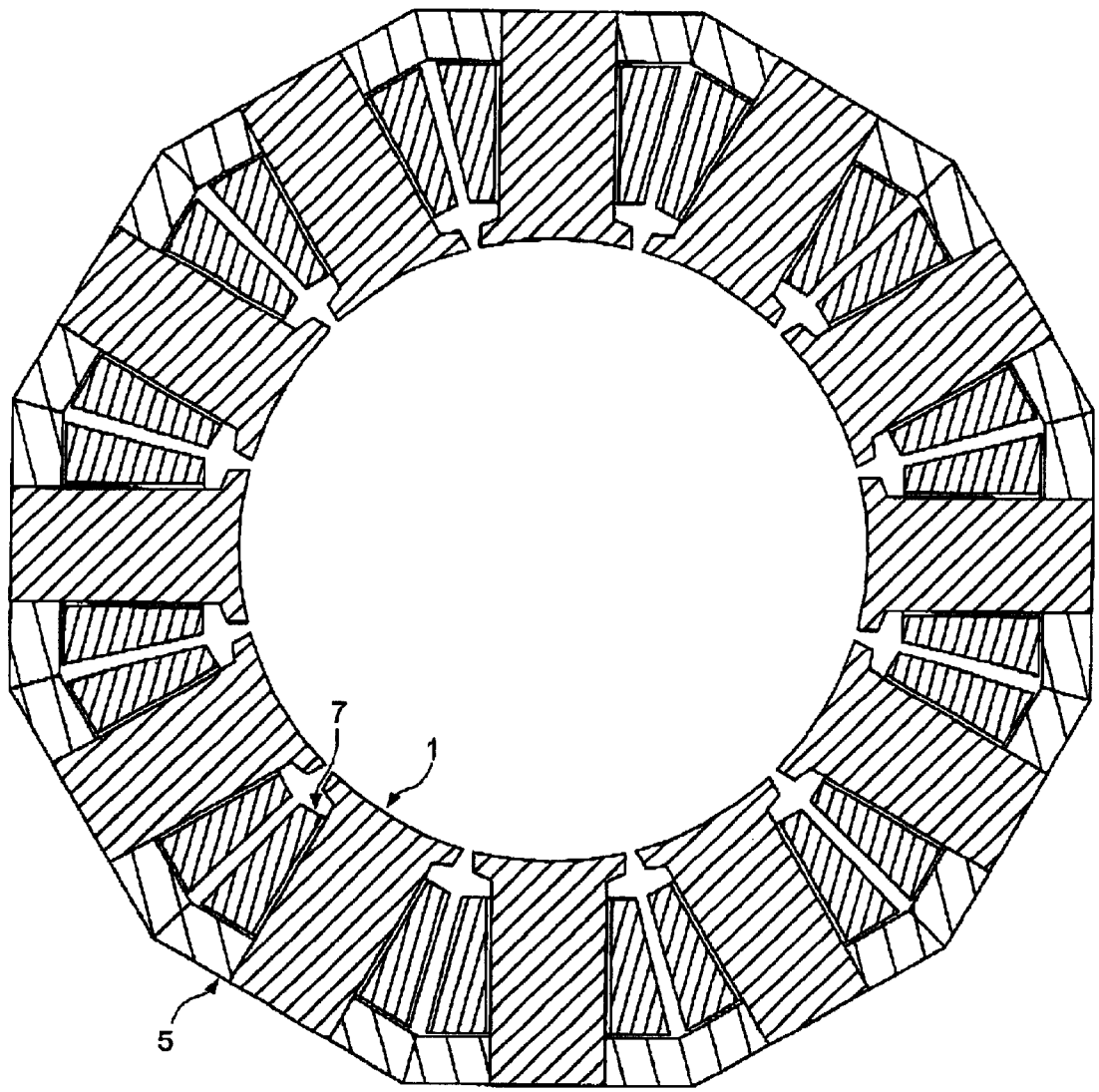
FIG 9 is a cross-sectional view of the stator core according to the first embodiment of the present invention as shown in FIG. 1.

FIGS. 1, 5 and 6 also illustrate a coil 7 to be assembled with the tooth 1 and the core-back section 5 to form a stator section, as shown assembled in FIGS. 5 and 6. Further, as shown in FIG. 9, nine such stator sections may be assembled to form a complete stator core but the number of sections used may be varied by appropriately changing the dimensions and angles of each tooth 1 and core-back section 5.

In assembling a single stator section, the coil 7 is first slid on to the stem 2 of the tooth 1 from the proximal end portion 4 towards the distal tip 3. In order that this should be possible without any substantial gap existing between the coil 7 and the tooth 1 in the assembled state, stem 2 should have non-decreasing cross-sectional dimensions, i.e. substantially constant or increasing cross-sectional dimensions, from the proximal end portion 4 to the distal tip 3, i.e. along a length of the tooth corresponding to a winding slot. Also, the shape of the central hole of the coil 7 should correspond to the shape of the stem 2.

Figure 7:
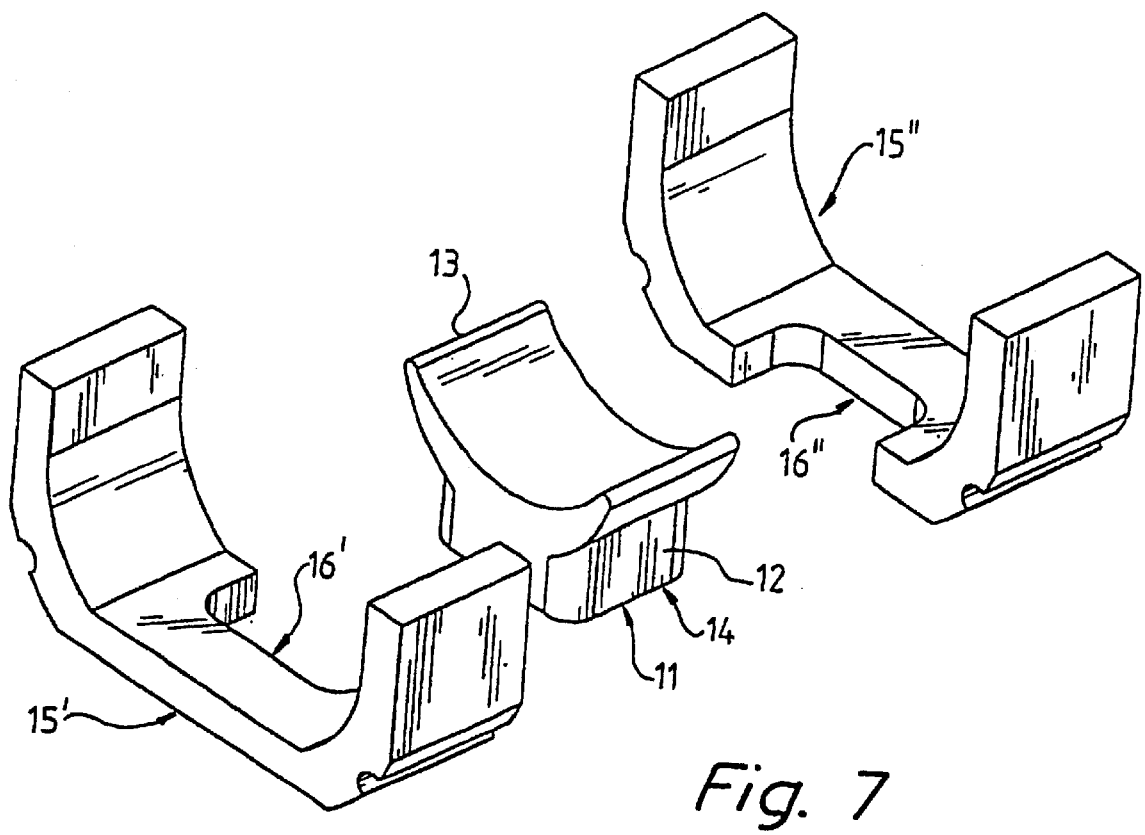
FIG. 7 is a perspective view showing a separate tooth and a separate core-back section according to a second embodiment of the present invention.
Figure 8:
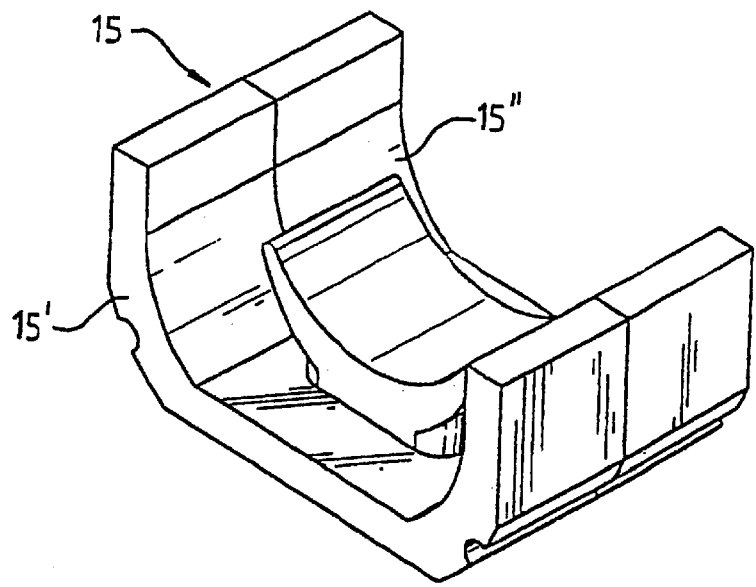
FIG. 8 is a perspective view showing the components of FIG. 7 in an assembled state.

The second embodiment of a stator core illustrated in FIGS. 7 and 8 comprises a tooth 11 having a stem 12, a distal tooth tip 13, and a proximal end portion 14. Further, this stator core has a core-back section 15 split into two symmetrical halves 15' and 15" which when assembled as shown in FIG. 8 has a hole 16', 16" having the same shape as the proximal end portion 14 of the tooth 11. As a consequence of the split core-back section 15, the hole 16', 16', and the proximal end portion 14 may have such a shape that the tooth 11 is fixed between the two halves 15' and 15" in the assembled state of the stator core section.

To form a complete stator core the components shown in FIGS. 7 and 8 are doubled and assembled with a coil on each one of the two the opposing teeth.

While two embodiments of the present invention are described above, it is obvious to the man skilled in the art that several modifications are possible without departing from the spirit of the present invention.

Thus, the core-back sections 5 of the first embodiment may be split in the same way as the core-back sections 15 of the second embodiment. Further, each one of these halves may be integrated with the nearest half of an adjoining core-back section 5, such that each core-back section includes a half of each of two openings.

What is claimed is:

1. A stator core for an electrical machine, comprising;
   an annular yoke having a plurality of teeth spaced circumferentially on the annular yoke and extending radially therefrom, spaces between the teeth defining a plurality of circumferentially spaced winding slots,
   wherein each of the plurality of teeth is formed as a separate component from a soft magnetic powder material, each tooth having non-decreasing cross-sectional dimensions in a direction towards a distal tip along a length of the tooth corresponding to one of the respective winding slots, and having the same or smaller cross-sectional dimensions along a proximal end of the tooth;
   wherein the annular yoke comprises a plurality of core-back sections corresponding in number to the number of said plurality of teeth such that each of the plurality of teeth can be assembled with one of said core-back sections of the annular yoke for receiving a coil before assembly of the annular yoke;
   wherein each said core-back section includes an opening; and
   wherein a portion of each said tooth is received in the opening in a corresponding said core-back section, the portion of each said tooth being enclosed essentially entirely along a perimeter of the tooth by the corresponding said core-back section, the perimeter being in a plane essentially orthogonal to said radial direction.

2. A stator core for an electrical machine as claimed in claim 1, wherein each said opening receives the proximal end of one of the plurality of teeth.

3. A stator assembly for an electrical machine, comprising a stator core as claimed in claim 2, and further comprising coils wound directly on the teeth before the assembling thereof with the yoke.

4. A stator assembly for an electrical machine, comprising a stator core as claimed in claim 2, and separately wound bobbin coils inserted on the teeth before the assembling thereof with the yoke.

5. A stator core for an electrical machine as claimed in claim 1, wherein each said core-back section is split in two halves, each half including half of the corresponding opening.

6. A stator assembly for an electrical machine, comprising a stator core as claimed in claim 5, and further comprising coils wound directly on the teeth before the assembling thereof with the yoke.

7. A stator assembly for an electrical machine, comprising a stator core as claimed in claim 5, and separately wound bobbin coils inserted on the teeth before the assembling thereof with the yoke.

8. A stator core for an electrical machine as claimed in claim 1, wherein each core-back section includes a half of each of two openings.

9. A stator assembly for an electrical machine, comprising a stator core as claimed in claim 8, and further comprising coils wound directly on the teeth before the assembling thereof with the yoke.

10. A stator assembly for an electrical machine, comprising a stator core as claimed in claim 8, and separately wound bobbin coils inserted on the teeth before the assembling thereof with the yoke.

11. A stator assembly for an electrical machine, comprising a stator core as claimed in claim 1, and further comprising coils wound directly on the teeth before the assembling thereof with the yoke.

12. A stator assembly for an electrical machine, comprising a stator core as claimed in claim 1, and separately wound bobbin coils inserted on the teeth before the assembling thereof with the yoke.

13. A stator core for an electrical machine as claimed in claim 1, wherein each said opening defines a through-hole in said respective core-back section.

* * * * *